US011961052B2

(12) United States Patent
Reaume et al.

(10) Patent No.: US 11,961,052 B2
(45) Date of Patent: Apr. 16, 2024

(54) SYSTEMS AND METHODS FOR WEAR ASSESSMENT AND PART REPLACEMENT TIMING OPTIMIZATION

(71) Applicant: Caterpillar Inc., Peoria, IL (US)

(72) Inventors: Daniel Joseph Reaume, Midland, MI (US); Daniel Jude Organ, Peoria, IL (US); Michael Sharov, Winnetka, IL (US)

(73) Assignee: Caterpillar Inc., Peoria, IL (US)

( * ) Notice: Subject to any disclaimer, the term of this patent is extended or adjusted under 35 U.S.C. 154(b) by 362 days.

(21) Appl. No.: 17/123,058

(22) Filed: Dec. 15, 2020

(65) Prior Publication Data

US 2022/0188774 A1 Jun. 16, 2022

(51) Int. Cl.
*G06Q 10/20* (2023.01)
*G05B 19/048* (2006.01)

(52) U.S. Cl.
CPC ........... *G06Q 10/20* (2013.01); *G05B 19/048* (2013.01)

(58) Field of Classification Search
None
See application file for complete search history.

(56) References Cited

U.S. PATENT DOCUMENTS

| 5,566,273 A | 10/1996 | Huang et al. | |
|---|---|---|---|
| 2011/0231169 A1* | 9/2011 | Furem | E02F 9/2054 703/2 |
| 2015/0206104 A1* | 7/2015 | Suzuki | G06Q 50/10 705/305 |
| 2016/0163130 A1* | 6/2016 | Zagajac | G07C 5/0808 701/29.1 |

(Continued)

FOREIGN PATENT DOCUMENTS

| CA | 3005183 A1 | 11/2018 |
|---|---|---|
| CN | 109191367 A | 1/2019 |

(Continued)

OTHER PUBLICATIONS

Seff, Ari, et al. "Sketchgraphs: A large-scale dataset for modeling relational geometry in computer-aided design", Jul. 16, 2020, arXiv preprint arXiv:2007.08506. (Year: 2020).*

(Continued)

*Primary Examiner* — Sarah M Monfeldt
*Assistant Examiner* — Michael J. Monaghan

(57) ABSTRACT

A method for part replacement timing optimization. The method includes training a wear estimate model. Training the model includes predicting a plurality of wear patterns for a part, each wear pattern corresponding to a degree of severity. Training images are rendered for each wear pattern. Each of the training images is labeled with the corresponding degree of severity. A neural network is then trained with the labeled training images. An image of a deployed part associated with a machine is received and fed into the trained wear estimate model. The method further includes receiving a wear estimate for the part image from the trained wear estimate model, estimating a change in performance of the machine based on the wear estimate, and determining a machine utilization pattern for the machine. The machine utilization pattern and the change in performance estimate are combined to determine an optimal time to replace the part.

20 Claims, 7 Drawing Sheets

(56) References Cited

U.S. PATENT DOCUMENTS

| | | |
|---|---|---|
| 2016/0237640 A1 | 8/2016 | Carpenter |
| 2016/0239584 A1* | 8/2016 | Steele, Jr. ............... G06T 11/60 |
| 2017/0356164 A1* | 12/2017 | Recker ................. E02F 9/2054 |
| 2018/0100292 A1* | 4/2018 | Bewley ................. E02F 9/2816 |
| 2018/0365565 A1* | 12/2018 | Panciatici ............... G06T 17/00 |
| 2019/0073438 A1* | 3/2019 | Mariappasamy ... G06F 3/04847 |
| 2019/0235484 A1* | 8/2019 | Ristovski ................. G06F 17/11 |
| 2020/0074414 A1* | 3/2020 | Restum ................... E02F 3/907 |
| 2020/0090419 A1* | 3/2020 | Rajkumar ................. G06N 5/02 |
| 2020/0096985 A1* | 3/2020 | Wenzel ............... G05B 13/047 |
| 2020/0225655 A1 | 7/2020 | Cella et al. |
| 2020/0401803 A1* | 12/2020 | Gilbert ................... G06T 11/60 |
| 2021/0049479 A1* | 2/2021 | Kale ..................... G06F 3/0679 |
| 2021/0248444 A1* | 8/2021 | Wang ...................... G06N 3/04 |
| 2021/0262204 A1* | 8/2021 | Tafazoli Bilandi .... G06N 3/045 |
| 2021/0339758 A1* | 11/2021 | Laperle ................. G06T 7/0002 |
| 2021/0383160 A1* | 12/2021 | Vander Neut ....... G06F 18/2413 |
| 2022/0016939 A1* | 1/2022 | Doraiswamy .......... G06N 3/084 |
| 2022/0035970 A1* | 2/2022 | Cheshire ................ G06F 30/10 |
| 2022/0067667 A1* | 3/2022 | Mahipal ................ G06N 20/00 |
| 2022/0114560 A1* | 4/2022 | Senzer ................... G07C 5/085 |
| 2022/0187819 A1* | 6/2022 | Shalaby ............... G06F 18/213 |

FOREIGN PATENT DOCUMENTS

| | | |
|---|---|---|
| CN | 111444864 A | 7/2020 |
| WO | 2014044906 W | 3/2014 |
| WO | 2019227194 A1 | 12/2019 |

OTHER PUBLICATIONS

Shi Yupeng et al.: "Intelligent identification for working-cycle stages of excavator based on main pump pressure", Automation in Construction, Elsevier, Amsterdam, NL, vol. 109, Nov. 4, 2019 (Nov. 4, 2019), XP085918409, ISSN: 0926-5805,DOI: 10.1016/J. Autcon.2019.102991 9retrieved on Nov. 4, 2019] abstract.

Written Opinion and International Search Report for Int'l. Patent Appln. No. PCT/US2021/062311, dated Mar. 28, 2022 (8 pgs).

* cited by examiner

SYSTEMS AND METHODS FOR WEAR ASSESSMENT AND PART REPLACEMENT TIMING OPTIMIZATION

TECHNICAL FIELD

This patent application is directed to machine maintenance, and more specifically, to cost efficient part replacement.

BACKGROUND

As equipment is used, certain parts progressively wear out. This wear at some point starts to degrade performance of the equipment such that it is economically preferable to replace the parts. For example, worn ground engaging tools (e.g., excavator teeth) lead to higher fuel consumption, lower productivity, and excess wear to other components.

Identifying the optimal point in time to replace a worn part can be challenging. For example, estimating the degree of wear for a part and extrapolating how that wear will progress is a difficult task and typically includes time-consuming physical measurements. Determining the economic tradeoff between the cost of replacing a part and continuing to operate with a worn part should take into account many variables, many of which can vary by machine and operating circumstances. Equipment can experience different performance degradation under different circumstances. For example, digging in heavy clay may benefit from newer bucket tips, whereas one digging in sand would experience little benefit. Thus, there is a need to accurately predict wear and estimate the most cost effective part replacement timing.

Efforts have been made to use image recognition to monitor wear of machine parts. For example, International Publication No. WO2019/227194 to Tafazoli Bilandi et al., (hereinafter "Tafazoli") describes a method and system for monitoring a condition associated with operating heavy equipment. The method involves receiving a plurality of images at an interface of an embedded processor disposed on the heavy equipment, the images providing a view of at least an operating implement of the heavy equipment. The method also involves processing each of the plurality of images using a first neural network implemented on the embedded processor, the first neural network having been previously trained to identify regions of interest within the image. Each region of interest has an associated designation as at least one of a critical region suitable for extraction of critical operating condition information required for operation of the heavy equipment, and a non-critical region suitable for extraction of non-critical operating condition information associated with the operation of the heavy equipment. The method further involves causing the embedded processor to initiate further processing of image data associated with critical regions to generate local output operable to alert an operator of the heavy equipment of the associated critical operating condition. Tafazoli can identify some critical operating conditions such as a tooth missing from an excavator bucket and can monitor tooth length for wear monitoring, for example.

As another example, U.S. Patent Publication No. 2020/0225655 to Cella et al., (hereinafter "Cella") describes a method for analyzing data from a single component over different time periods, such as cycle-to-cycle comparisons or the like. Data from multiple components of the same type may also be analyzed over different time periods. Trends in the data such as changes in frequency or amplitude may be correlated with failure and maintenance records associated with the same component or piece of equipment. Trends in the data such as changing rates of change associated with start-up or different points in the process may be identified. Additional data may be introduced into the analysis such as output product quality, output quantity (such as per unit of time), indicated success or failure of a process, and the like. Correlation of trends and values for different types of data may be analyzed to identify those parameters whose short-term analysis might provide the best prediction regarding expected performance. The analysis may identify recommendations regarding needed maintenance and repair and/or the scheduling of preventative maintenance. The analysis may identify recommendations around purchasing replacement bearings and the timing of the replacement of the bearings. The analysis may result in warnings regarding the dangers of catastrophic failure conditions.

Both Tafazoli and Cella are directed, at least in part, to identifying wear using image recognition. However, they continue to use conventional image recognition models and methods for training those models. Furthermore, Tafazoli does not predict part replacement timing and although Cella provides a recommendation around purchasing replacement parts and the timing of replacement, Cella simply estimate the timing based on historical data for similar part replacements.

Thus, there are still opportunities to improve on the accuracy of image recognition for part wear assessment as well as optimizing the timing of part replacement based on cost. The example systems and methods described herein are directed toward overcoming one or more of the deficiencies described above.

SUMMARY

In some embodiments, a method for part replacement timing optimization can include training a wear estimate model by predicting a plurality of wear patterns for a part, each wear pattern corresponding to a degree of severity, and rendering a plurality of training images, each representing a corresponding one of the plurality of wear patterns. Training the wear estimate model can include labeling each of the plurality of training images with the corresponding degree of severity and training a neural network with the plurality of labeled training images. The method can further include receiving a part image of a deployed part associated with a machine and feeding the part image into the trained wear estimate model to receive a wear estimate for the part image from the trained wear estimate model. The method can include estimating a change in performance of the machine based on the wear estimate. The method can also include determining a machine utilization pattern for the machine. The method can further include combining the machine utilization pattern and the change in performance estimate to determine an optimal time to replace the part.

In some aspects, predicting the plurality of wear patterns comprises using a physics-based wear model. In further aspects, training the wear estimate model further comprises supplementing the plurality of training images with a plurality of labeled training photos of used parts. According to a further aspect, determining the optimal time to replace the deployed part comprises calculating a time period after which the cost of continuing to run the machine with the deployed part exceeds the total cost to replace the deployed part. In some aspects, determining the machine utilization pattern for the machine comprises receiving telemetry data from the machine. In some aspects, the method further comprises identifying at least one of the machine or the deployed part.

In some embodiments, a part replacement timing optimization system can include one or more processors and one or more memory devices having stored thereon instructions. When executed by the one or more processors the instructions can cause the one or more processors to receive a part image, from an image capture device, of a deployed part associated with a machine and feed the part image into a trained wear estimate model. The instructions can also cause the one or more processors to receive a wear estimate for the part image from the trained wear estimate model and estimate a change in performance of the machine based on the wear estimate. The instructions can also cause the one or more processors to receive telemetry data from the machine and determine a machine utilization pattern for the machine based on the telemetry data. The instructions can also cause the one or more processors to combine the machine utilization pattern and the change in performance estimate to determine an optimal time to replace the part.

In some aspects, training the wear estimate model can include predicting a plurality of wear patterns for the part, each wear pattern corresponding to a degree of severity, and rendering a plurality of training images, each representing a corresponding one of the plurality of wear patterns. Training the wear estimate model can include labeling each of the plurality of training images with the corresponding degree of severity and training a neural network to recognize the plurality of labeled training images. In further aspects, predicting the plurality of wear patterns comprises using a physics-based wear model. In some aspects, training the wear estimate model further comprises supplementing the plurality of training images with a plurality of labeled training photos of used parts. In some aspects, determining the machine utilization pattern can comprise applying a neural network to the telemetry data. According to some aspects, determining the optimal time to replace the deployed part comprises calculating a time period after which the cost of continuing to run the machine with the deployed part exceeds the total cost to replace the deployed part. In some aspects, the system can further include instructions identifying at least one of the machine or the deployed part.

In some embodiments, one or more non-transitory computer-readable media can store computer-executable instructions that, when executed by one or more processors, cause the one or more processors to perform operations. The operations can include training a wear estimate model by predicting a plurality of wear patterns for a part, each wear pattern corresponding to a degree of severity, and rendering a plurality of training images, each representing a corresponding one of the plurality of wear patterns. Training the wear estimate model can include labeling each of the plurality of training images with the corresponding degree of severity and training a neural network with the plurality of labeled training images. The operations can further include receiving a part image of a deployed part associated with a machine and feeding the part image into the trained wear estimate model to receive a wear estimate for the part image from the trained wear estimate model. The operations can include estimating a change in performance of the machine based on the wear estimate and determining a machine utilization pattern for the machine. The operations can further include combining the machine utilization pattern and the change in performance estimate to determine an optimal time to replace the part.

According to some aspects, predicting the plurality of wear patterns comprises using a physics-based wear model. In some aspects, training the wear estimate model further comprises supplementing the plurality of training images with a plurality of labeled training photos of used parts. In further aspects, determining the optimal time to replace the deployed part comprises calculating a time period after which the cost of continuing to run the machine with the deployed part exceeds the total cost to replace the deployed part. In some aspects, determining the machine utilization pattern for the machine comprises receiving telemetry data from the machine. According to some aspects, determining the machine utilization pattern comprises applying a neural network to the telemetry data. In further aspects, the operations can further include identifying at least one of the machine or the deployed part.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
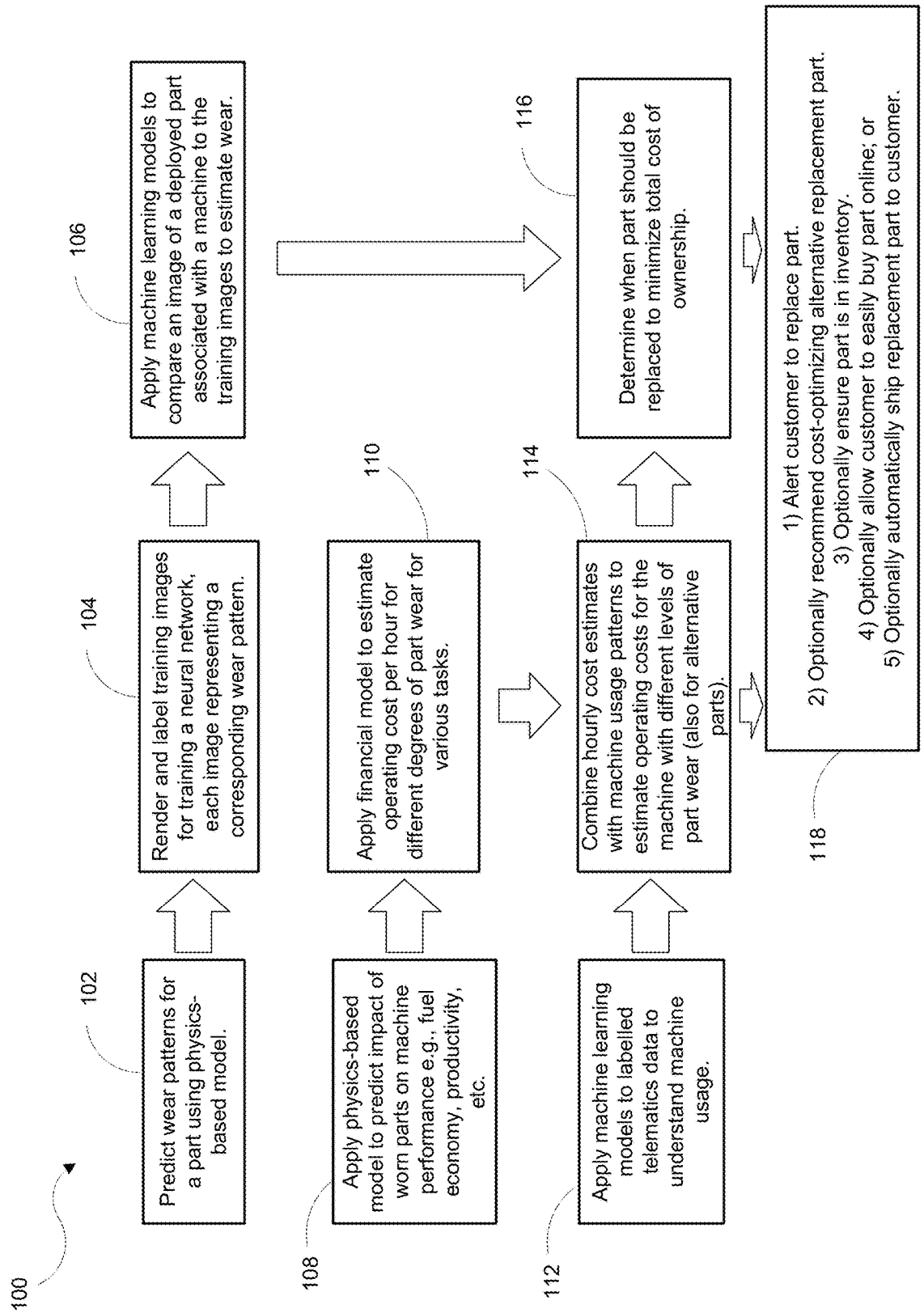
FIG. 1 illustrates a wear assessment and part replacement timing optimization system according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for assessing wear for a part on an asset, e.g., a machine, and determining the optimum time to replace the part. With an estimate of the current wear on a part, the system can estimate impacts on performance of the machine in terms of cost. Coupled with information regarding machine usage the system can determine when the cost of operating with a worn part would exceed the costs to replace the part. This capability applies to parts that degrade through wear that is visually detectable as a change in the shape or appearance of the part. For example and without limitation, such parts can include ground engaging tools, undercarriage parts, and tires. Assets include trucks, tracked-type tractors, excavators, wheel loaders, front end loaders, and other equipment.

FIG. 1 illustrates a wear assessment and part replacement timing optimization system 100 according to some embodiments of the disclosed technology. The system 100 trains a wear estimate model by creating a library of training images. These training images are created by applying a physics-based wear model to predict a plurality of wear patterns for a part at block 102. Each wear pattern corresponds to a degree of severity. In some embodiments, a physics based wear model can include estimating wear based on the number of cycles of movement with a particular load. The number of cycles can include counting movements of a particular part or estimating typical cycles per hour. For example, estimating the wear of an excavator tooth can include calculating the product of the number of boom, arm, and/or bucket movements, a known force applied by the excavator arm, and a wear factor based on material (e.g., soil, sand, clay, or rock). The result can represent the amount of material (i.e., metal) that is chipped, worn, or otherwise removed from a tooth. This type of physics-based model can be run for different numbers of cycles and conditions to create different wear patterns and severities. In some embodiments, the bucket tooth to ground interaction can be modeled using a particle model for the earthen material, and use the shear energy or frictional work between the particles and the bucket tooth to indicate wear rate at different locations along the surface of the bucket tooth. The magnitude of shear energy at each point on the tooth scales with the shape change and produces the worn shape over multiple dig iterations.

With the data from the physics-based wear models of block 102, training images can be rendered at block 104 with computer aided design (CAD) tools to create photo-realistic images of parts having the calculated wear severity and patterns. Each training image can be labeled with the corresponding degree of severity, usage (e.g., cycle or time), and/or load (e.g., soil, sand, clay, or rock), for example. This novel approach to developing a training library allows many training images to be created, each having accurate and detailed labeling. Creating such a library from photos alone requires knowledge of the circumstances of how the wear in each photo occurred, which is difficult to capture and retain. At best, the number of properly labeled photos is severely limited. However, in some embodiments, the CAD produced training images can be supplemented with properly documented photos.

Because the training images are produced from CAD models, images of a part as viewed from different angles can easily be created. Also, different lighting effects and backgrounds can be applied to the images. In some embodiments, simulated rust and dirt can be applied to represent typical conditions of a part in use. Many CAD programs allow for parametric modeling by which dimensions of the part can be managed by tabulated data. Using parametric modeling, the creation of part images for all of the combinations of severity, cycles, and load, for example, can be automated.

Once the training image library for a particular part is created, a corresponding machine learning wear estimate model (e.g., a convolutional neural network) is trained using the library. Alternatively, other image recognition techniques may be employed that recognize edges and other features to more directly identify the shapes of parts. At block 106 a photograph of a deployed part, i.e., a part in use on a machine, is fed into the wear estimate model to receive a wear estimate (e.g., in percentage) for the part. The disclosed technology provides at least one advantage over manual inspection of parts in that it can accurately estimate severity of wear and number of cycles (or e.g., hours) on a part. Although manual inspection can be accurate for brand new parts or parts that are completely missing, the degree of wear is otherwise completely subjective. Furthermore, multiple photos of a deployed part can be captured over time and fed into the system to predict the rate of part wear and project the resulting increasing degradation of machine performance. In some embodiments, if a unique wear pattern cannot be uniquely identified, an average of the wear from the most likely images may be employed instead.

To facilitate further accuracy, in some embodiments, the photograph(s) of the deployed part may be taken from a standardized position with standardized backgrounds, lighting, etc. The part may also be cleaned. In some embodiments, the photographs can be taken with typical digital cameras or cellphone cameras. In some embodiments, photographs can be taken from a stationary camera or video system stationed on the side of a road at a worksite to capture parts (e.g., tires) on machines as they drive by. In some embodiments, the camera can be an infrared or other specialized camera. The CAD programs used to create the training images can be interfaced with thermodynamic finite element analysis (FEA) software, for example, to estimate temperature gradients for parts that can be captured with infrared cameras, thereby creating a training library for infrared images.

It may be desirable to combine together several images of the part to identify and/or assess the wear. Multiple images may be combined using technology described in co-pending U.S. application Ser. No. 17/123,051, filed Dec. 15, 2020, entitled SYSTEMS AND METHODS FOR PART IDENTIFICATION AND ASSESSMENT USING MULTIPLE IMAGES, the disclosure of which is incorporated herein by reference in its entirety.

In some embodiments, either via direct user input or machine vision algorithms, developed for such identification, the part and/or machine may be identified. For example, the identification process may be aided by identifying the type of part being examined (e.g. bucket tooth, rock-chisel bucket tooth) and/or the machine type to narrow down possibilities and enable a simpler machine learning algorithm restricted to one or a small number of parts.

Based on the wear estimate from block 106, the change in performance of the machine due to the worn part can be estimated at block 108. The change in performance can be estimated with a physics-based model. The performance parameters may include fuel consumption, fullness of bucket loads, and damage to other components as a result of using the machine more forcefully to compensate for the worn part. In some embodiments, the change in performance of the machine for a given task is proportional to the estimated wear to the part. For example, an excavator tooth with 20% wear can cause a 3% reduction in the excavator's performance in terms of bucket loading efficiency while digging. The reduction in performance may vary by task. For example, the same worn tooth may cause a much lower reduction in performance (e.g., 1%) if loading dirt rather than digging.

A financial model at block 110 can be applied to the change in performance to estimate operating costs per hour for different degrees of part wear for various tasks. For example, the financial model can estimate the increase in labor and fuel costs to compensate for the 3% reduction in bucket loading efficiency. In some embodiments, the costs to compensate for a decrease in machine performance is proportional to the decrease in machine performance. For example, a 3% reduction in bucket loading efficiency results in a 6% per hour increase in fuel costs. As another example, each hour of operation at 90% bucket tip wear may result in a 10 hour reduction in engine life, at a cost of $10 per hour.

In some embodiments, the physics-based model in block 108 may be coupled with the model in block 102 to estimate the evolution of performance parameters over time. For example, a part with 60% wear will require 5% more fuel; but, if continued to be used, after 10 more hours in service, it will be 65% worn and require 12% more fuel. The decrease in performance can be translated into e.g., cost per hour using a financial model, for example.

In some embodiments, the system determines a machine utilization pattern for the machine at block 112. Because the performance change and cost per hour can be task dependent, knowing how the machine is used can help determine when to replace the part. A machine learning model (such as a neural network) can be applied to estimate the machine's utilization patterns based on telematics data (i.e., telemetry data). As an example, an excavator can have a use pattern of activities including 50% digging, 20% loading, and 30% tracking (i.e., moving from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, trenching, scraping, grading, loading, tracking, or idle time. Models may supplement standard telematics data with additional sensors to measure the intensity of use.

Also, understanding the substance causing wear as part of the use case can also be useful. For example, performance degrades less when moving sand if tips are dull than when digging in rocky soil. In order to estimate the substance being moved or rubbed against, estimates of part wear after known hours of use may be compared. For example a part should have more wear after 10 hours of digging in rock than digging in sand. In some embodiments, the substance may be user-specified, as may the utilization pattern.

The machine utilization pattern and the hourly cost estimate can be combined to estimate operating costs for the machine with different levels of part wear at block 114. For the excavator tooth example above, an excavator tooth with 20% wear can cause a 3% reduction in bucket loading efficiency while digging, which results in a 6% per hour increase in fuel costs while digging. The data pattern from block 112 indicates that the excavator spends 50% of its time digging. Therefore, assuming an 8 hour day and a nominal cost of $250 in fuel per hour to run the excavator, it costs an extra $60 per day to run the excavator with the worn part (i.e., 6%*250*8 hours*50% digging). It should be noted the example wear estimates, usage patterns and costs are hypothetical and are not intended to represent actual data, but to illustrate the calculations involved in some embodiments of the disclosed technology.

In some embodiments, the trajectory of costs can be included in the calculations. For example, the average incremental change in performance for the first hour of operation can be estimated with the worn part versus a new part given current wear; the average change in performance for the second hour of operation with the even more worn part versus a new part, etc. The incremental performance change may be relative to a new part of the same type as well as to other candidate replacement parts that may provide greater or lesser performance benefits.

A financial model can be used to determine when a part should be replaced to minimize the total cost of ownership at block 116. For example, if the incremental cost of ownership of replacing the part becomes less than that of continuing with the worn part, it is the optimal replacement time. In the excavator tooth example above, assuming total cost to replace the tooth (including e.g., labor, part cost, and down time) is $600, the tooth should be replaced within 10 days (i.e., $600/60$ per day).

In some embodiments, financial models can include the cost of lost productivity (e.g. 10% reduction in amount of material moved x value of material movement, labor costs per hour, etc.), the cost of excess fuel, and the cost of additional maintenance to other parts (e.g. hammering a bucket with worn teeth like a chisel may increase the wear or failure probability of other parts). In some embodiments, an optimization engine can be applied to the financial model to identify the optimal time to replace a worn part. Total cost of ownership of replacing a part can be compared relative to the base case of continuing to use the worn part that gets increasingly worn down. This cost may include the cost of the replacement part, required replacement labor, and any lost productivity required to perform the replacement. In some embodiments, costs can be assessed over a specified payback period of interest. The incremental cost of replacing a part may account for wear to the replacement part where such wear will quickly degrade performance, e.g. replacing a part used in digging in rock.

In some embodiments, the optimization of part replacement timing may identify a different optimal time for different replacement part candidates and based on other factors. For example, the optimal replacement time may be adjusted to coincide with other nearby planned maintenance epochs (e.g. oil changes) or optimal replacement times for other wear parts (e.g. several parts on the same bucket). The optimal time may also be set as a threshold defined by a performance guarantee, such as fuel usage or productivity.

Once the timing of replacing a part is determined, at block 118 the customer can be alerted to replace the part; an alternative cost-optimizing part can be recommended; inventory can be checked; the customer can order a part online; and/or a replacement part can be automatically shipped to the customer. In some cases, maintenance labor and garage space can be scheduled, and/or required tools and parts can be kitted. In some embodiments, the part replacement can initiate a phone call from technical support. In some embodiments, a suggested method for recycling or remanufacturing the worn part can be provided.

Figure 2:
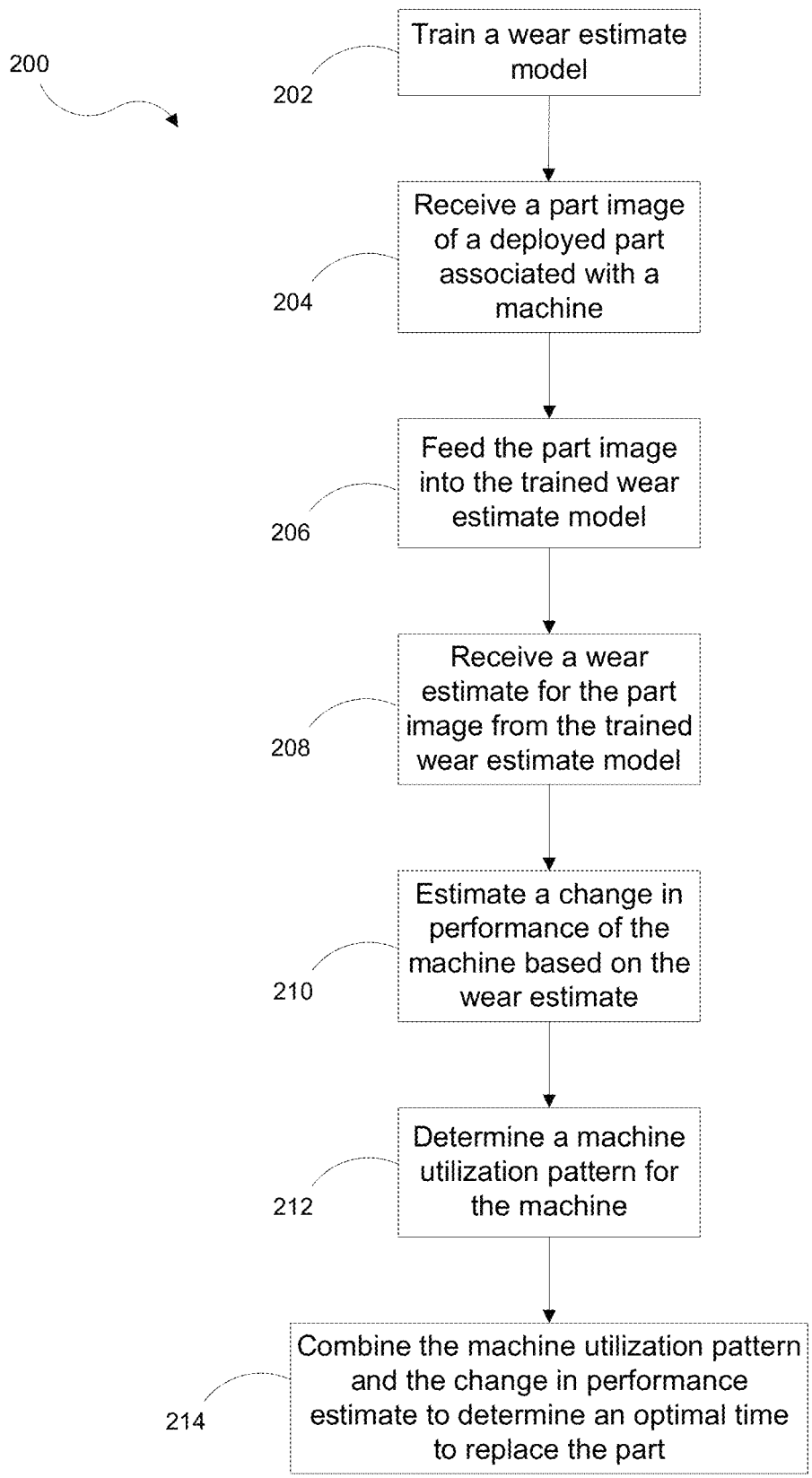
FIG. 2 is a flow diagram showing a method for part replacement timing optimization according to some embodiments of the disclosed technology.

FIG. 2 is a flow diagram showing a method 200 for part replacement timing optimization according to some embodiments of the disclosed technology. The method 200 can include training a wear estimate model at step 202. A part image of a deployed part (e.g., part installed on a machine) associated with a machine is received at step 204. At step 206 the part image is fed into the trained wear estimate model and a wear estimate for the part image is received from the trained wear estimate model at step 208. A change in performance of the machine is estimated based on the wear estimate at step 210. A machine utilization pattern for the machine is determined at step 212. The machine utilization pattern and the change in performance estimate are combined at step 214 to determine an optimal time to replace the part.

Figure 3:
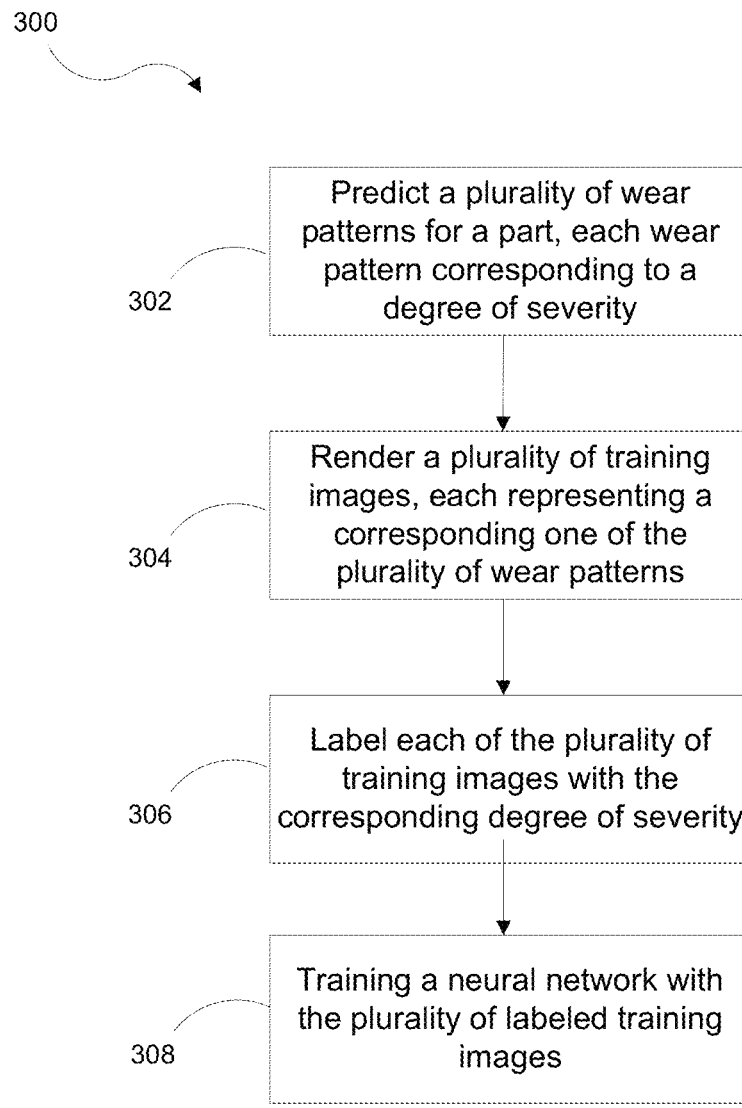
FIG. 3 is a flow diagram showing a method for training a wear estimate model according to some embodiments of the disclosed technology.

FIG. 3 is a flow diagram showing a method 300 for training a wear estimate model according to some embodiments of the disclosed technology. The method 300 can include predicting a plurality of wear patterns for a part at step 302, where each wear pattern corresponds to a degree of severity. The method can include rendering a plurality of training images at step 304, where each image represents a corresponding one of the plurality of wear patterns. Each of the plurality of training images is labeled at step 306 with the corresponding degree of severity. At step 308, a neural network is trained using the plurality of labeled training images.

Figure 4A:
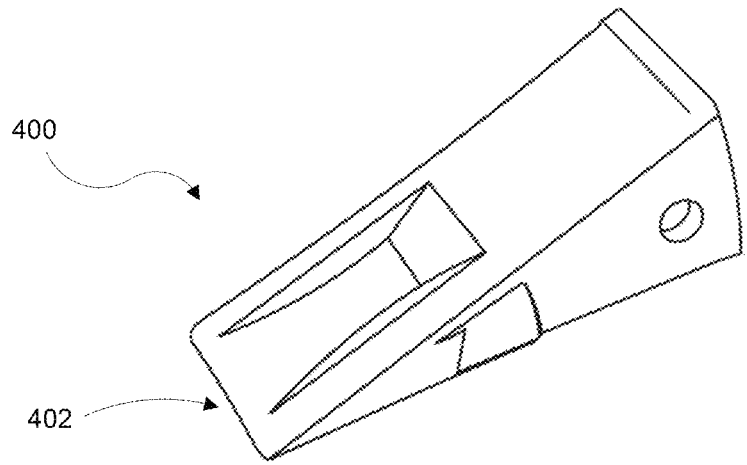
FIG. 4A is an isometric view depicting a rendered image of a machine part having minimal wear.
Figure 4B:
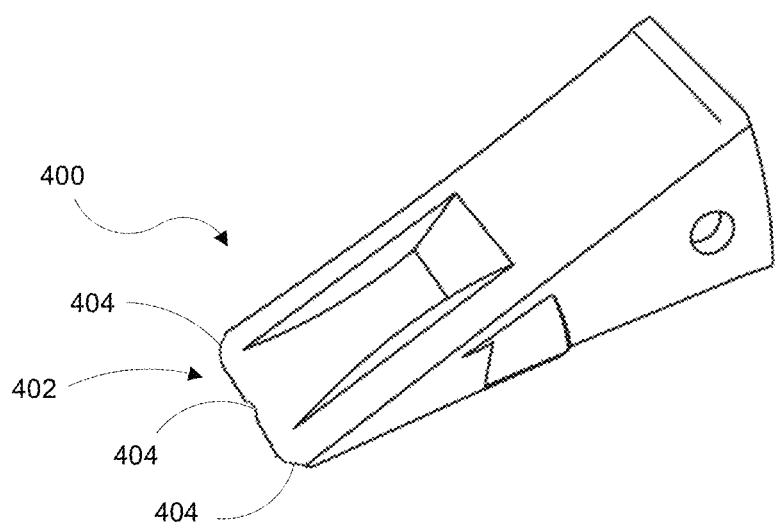
FIG. 4B is an isometric view depicting a rendered image of the machine part having minor wear.
Figure 4C:
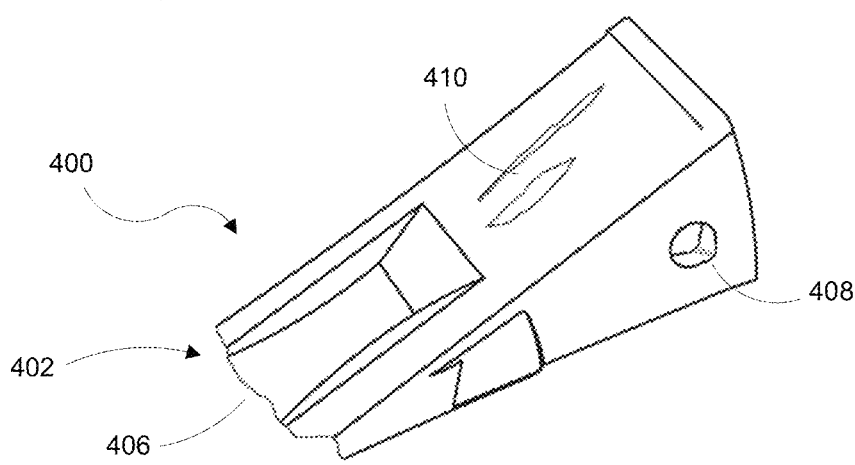
FIG. 4C is an isometric view depicting a rendered image of the machine part showing heavy wear.

FIGS. 4A-4C are isometric views depicting rendered images of a machine part 400 (e.g., excavator tooth) having varying degrees of wear. FIG. 4A represents the tooth 400 having minimal, if any wear. This rendering represents the tooth in as new condition or very lightly used having no wear along its leading edge 402. FIG. 4B represents the tooth 400 having some minor wear along the leading edge 402 including wear 404 at the corners and in the middle of leading edge 402. FIG. 4C represents the tooth 400 having heavy wear including a broken portion 406 with a large portion of the tooth missing. The renderings can also include patterns, such as gouges 410 and worn bearing or mounting holes, such as mounting hole damage 408. It should be understood that CAD programs have the capability to render photo-realistic images including surfaces representing different materials such as metal, plastic, and rubber to name a few. The renderings can also include rust, dirt, and grease, to name a few.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
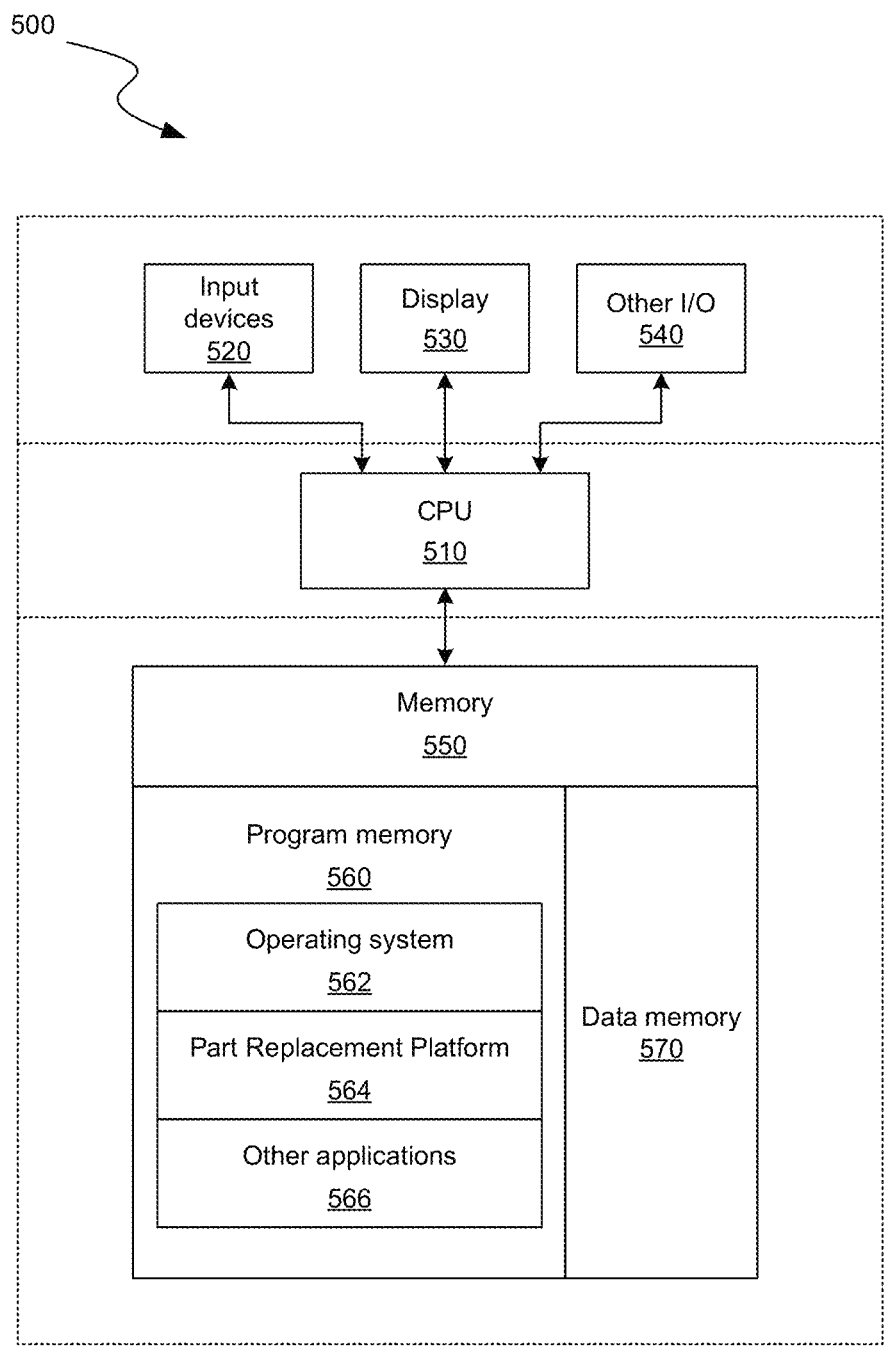
FIG. 5 is a block diagram illustrating an overview of devices on which some implementations can operate.

Several implementations are discussed below in more detail in reference to the figures. FIG. 5 is a block diagram illustrating an overview of devices on which some implementations of the disclosed technology can operate. The devices can comprise hardware components of a device 500 that performs wear assessment and part replacement timing optimization, for example. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, Part Replacement Platform 564, and other application programs 566. Memory 550 can also include data memory 570 that can include database information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
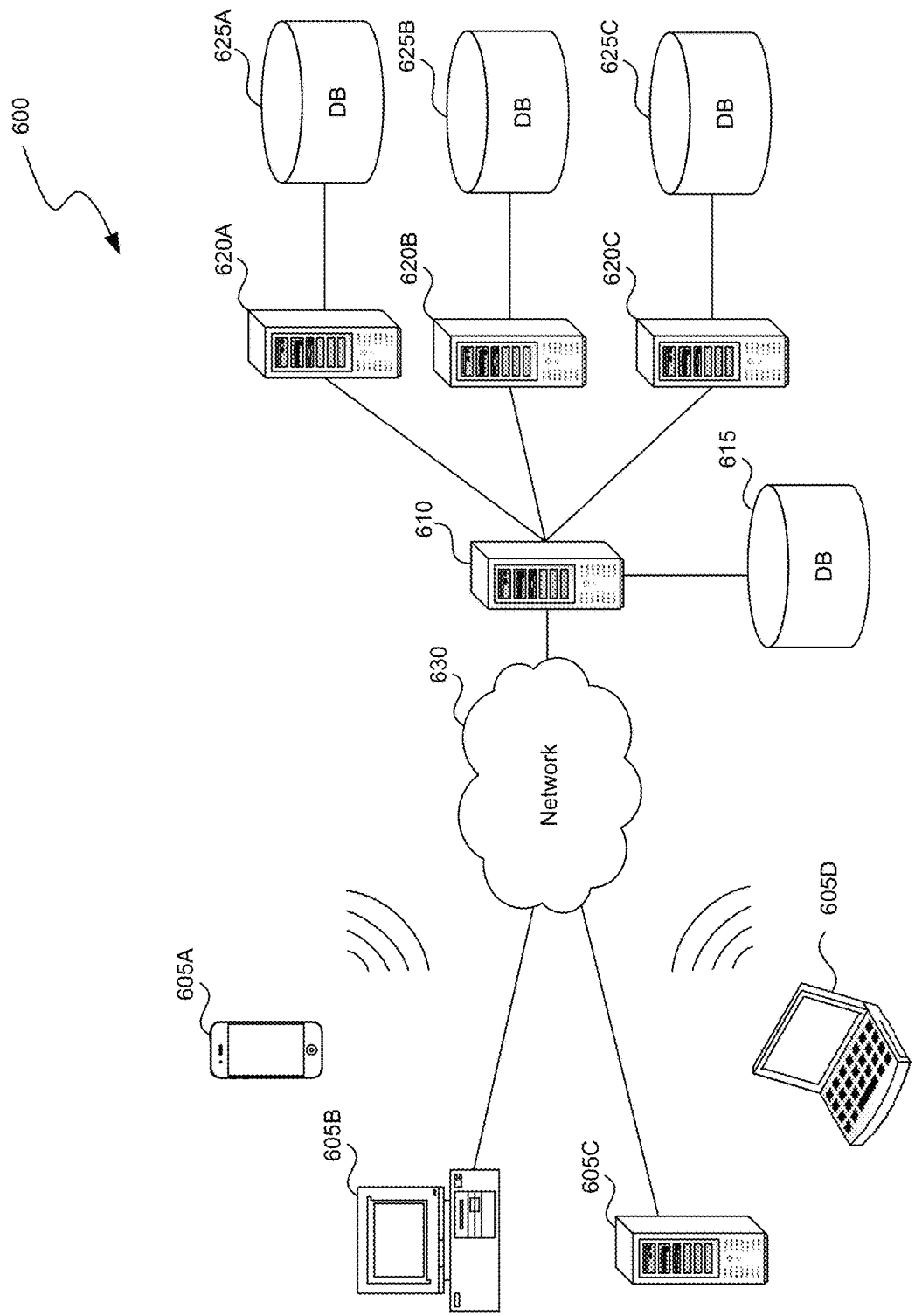
FIG. 6 is a block diagram illustrating an overview of an environment in which some implementations can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server computing device 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
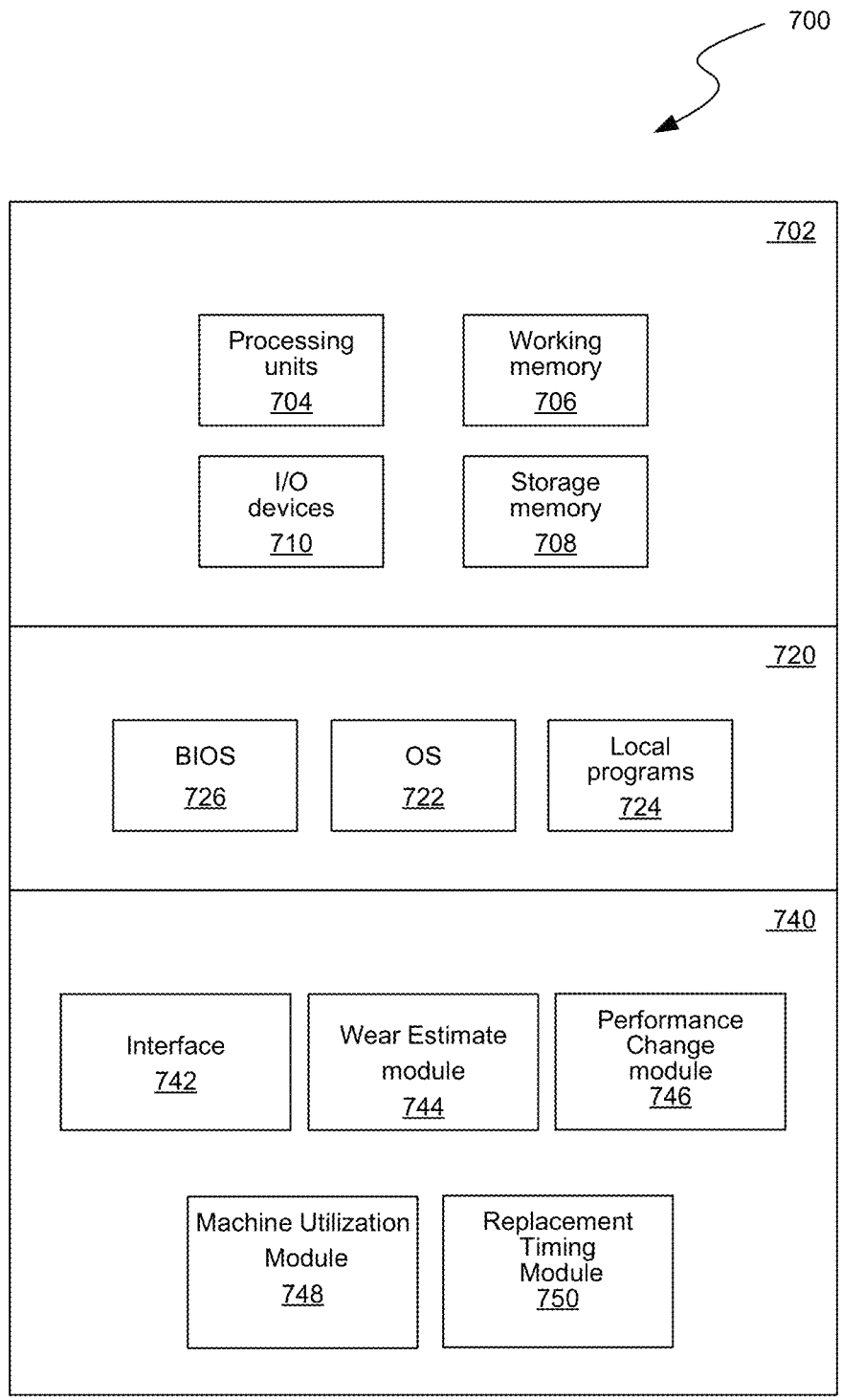
FIG. 7 is a block diagram illustrating components which, in some implementations, can be used in a system employing the disclosed technology.

FIG. 7 is a block diagram illustrating components 700 which, in some implementations, can be used in a system employing the disclosed technology. The components 700 include hardware 702, general software 720, and specialized components 740. As discussed above, a system implementing the disclosed technology can use various hardware, including processing units 704 (e.g., CPUs, GPUs, APUs, etc.), working memory 706, storage memory 708, and input and output devices 710. Components 700 can be implemented in a client computing device such as client computing devices 605 or on a server computing device, such as server computing device 610 or 620.

General software 720 can include various applications, including an operating system 722, local programs 724, and a basic input output system (BIOS) 726. Specialized components 740 can be subcomponents of a general software application 720, such as local programs 724. Specialized components 740 can include a Wear Estimate Module 744, a Performance Change Module 746, a Machine Utilization Module 748, a Part Replacement Timing Module 750, and components that can be used for transferring data and controlling the specialized components, such as interface 742. In some implementations, components 700 can be in a computing system that is distributed across multiple computing devices or can be an interface to a server-based application executing one or more of specialized components 740.

Those skilled in the art will appreciate that the components illustrated in FIGS. 5-7 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a wear assessment and part replacement timing optimization system can include a wear estimate module 744, a performance change module 746, a machine utilization module 748, and a replacement timing module 750 (FIG. 7). In operation, the wear estimate module 744 can train a wear estimate model by predicting a plurality of wear patterns for different parts using physics based models, where each wear pattern corresponds to a degree of severity. A plurality of photo-realistic training images are rendered using CAD, where each image represents a corresponding one of the plurality of wear patterns. Each of the plurality of training images is labeled with the corresponding degree of severity. A neural network is trained using the plurality of labeled training images. A part image of a deployed part associated with a machine is fed into the trained wear estimate model and a wear estimate for the part image is received. The performance change module 746 can estimate a change in performance of the machine based on the wear estimate using physics based models. The machine utilization module 748 can determine a machine utilization pattern for the machine using machine learning models and telemetry data from the machine. The replacement timing module 750 combines the machine utilization pattern and the change in performance estimate to determine the optimal time to replace the part. The disclosed technology, therefore, provides the most cost efficient timing to replace a part based on accurate wear and machine utilization estimates using machine learning models, thereby removing the subjective guesswork associated with traditional part replacement decisions.

Remarks

The above description and drawings are illustrative and are not to be construed as limiting. Numerous specific details are described to provide a thorough understanding of the disclosure. However, in some instances, well-known details are not described in order to avoid obscuring the description.

Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for part replacement timing optimization, comprising:
   training a wear estimate model, including:
   predicting a plurality of wear patterns for a part, each wear pattern corresponding to a degree of severity;
   automatically generating, by executing a parametric modeling operation, a plurality of training images, each training image in the plurality of training images representing a combination of a corresponding one of the plurality of predicted wear patterns, the degree of severity, and at least one of a load type and a cycle time; and
   labeling each of the plurality of training images with the corresponding degree of severity and the at least one of the load type and the cycle time;
   training a neural network with the plurality of labeled training images;
   receiving a part image of a deployed part associated with a machine;
   feeding the part image into the trained wear estimate model;
   receiving a wear estimate for the part image from the trained wear estimate model;
   estimating a change in performance of the machine based on the wear estimate;
   determining a machine utilization pattern for the machine; and
   combining the machine utilization pattern and the change in performance estimate to determine an optimal time to replace the part.

2. The method of claim 1, wherein predicting the plurality of wear patterns comprises using a physics-based wear model.

3. The method of claim 1, wherein training the wear estimate model further comprises supplementing the plurality of training images with a plurality of labeled training photos of used parts.

4. The method of claim 1, wherein determining the optimal time to replace the deployed part comprises calculating a time period after which the cost of continuing to run the machine with the deployed part exceeds the total cost to replace the deployed part.

5. The method of claim 1, wherein determining the machine utilization pattern for the machine comprises receiving telemetry data from the machine.

6. The method of claim 1, further comprising identifying at least one of the machine or the deployed part.

7. A part replacement timing optimization system, comprising:
   one or more processors; and
   one or more memory devices having stored thereon instructions that when executed by the one or more processors cause the one or more processors to:
   train a wear estimate model, including operations to:
   predict a plurality of wear patterns for a part, each wear pattern corresponding to a degree of severity;
   automatically generate, by executing a parametric modeling operation, a plurality of training images, each training image in the plurality of training images representing a combination of a corresponding one of the plurality of predicted wear patterns, the degree of severity, and at least one of a load type and a cycle time; and
   label each of the plurality of training images with the corresponding degree of severity and the at least one of the load type and the cycle time;
   train a neural network with the plurality of labeled training images;
   receive a part image, from an image capture device, of a deployed part associated with a machine;
   feed the part image into the trained wear estimate model;
   receive a wear estimate for the part image from the trained wear estimate model;
   estimate a change in performance of the machine based on the wear estimate;
   receive telemetry data from the machine;
   determine a machine utilization pattern for the machine based on the telemetry data; and
   combine the machine utilization pattern and the change in performance estimate to determine an optimal time to replace the part.

8. The system of claim 7, wherein predicting the plurality of wear patterns comprises using a physics-based wear model.

9. The system of claim 7, wherein training the wear estimate model further comprises supplementing the plurality of training images with a plurality of labeled training photos of used parts.

10. The system of claim 7, wherein determining the machine utilization pattern comprises applying a neural network to the telemetry data.

11. The system of claim 7, wherein determining the optimal time to replace the deployed part comprises calculating a time period after which the cost of continuing to run the machine with the deployed part exceeds the total cost to replace the deployed part.

12. The system of claim 7, further comprising instructions for identifying at least one of the machine or the deployed part.

13. One or more non-transitory computer-readable media storing computer-executable instructions that, when executed by one or more processors, cause the one or more processors to perform operations comprising:
 training a wear estimate model, including:
  predicting a plurality of wear patterns for a part, each wear pattern corresponding to a degree of severity;
  rendering automatically generating, by executing a parametric modeling operation, a plurality of training images, each training image in the plurality of training images representing a combination of a corresponding one of the plurality of predicted wear patterns, the degree of severity, and at least one of a load type and a cycle time; and
  labeling each of the plurality of training images with the corresponding degree of severity and the at least one of the load type and the cycle time;
 training a neural network with the plurality of labeled training images;
 receiving a part image of a deployed part associated with a machine;
 feeding the part image into the trained wear estimate model;
 receiving a wear estimate for the part image from the trained wear estimate model;
 estimating a change in performance of the machine based on the wear estimate;
 determining a machine utilization pattern for the machine; and
 combining the machine utilization pattern and the change in performance estimate to determine an optimal time to replace the part.

14. The one or more non-transitory computer-readable media of claim 13, wherein predicting the plurality of wear patterns comprises using a physics-based wear model.

15. The one or more non-transitory computer-readable media of claim 13, wherein training the wear estimate model further comprises supplementing the plurality of training images with a plurality of labeled training photos of used parts.

16. The one or more non-transitory computer-readable media of claim 13, wherein determining the optimal time to replace the deployed part comprises calculating a time period after which the cost of continuing to run the machine with the deployed part exceeds the total cost to replace the deployed part.

17. The one or more non-transitory computer-readable media of claim 13, wherein determining the machine utilization pattern for the machine comprises receiving telemetry data from the machine.

18. The one or more non-transitory computer-readable media of claim 17, wherein determining the machine utilization pattern comprises applying a neural network to the telemetry data.

19. The one or more non-transitory computer-readable media of claim 13, further comprising identifying at least one of the machine or the deployed part.

20. The method of claim 1, comprising labeling each of the plurality of training images with the corresponding degree of severity, the load type and the cycle time.

* * * * *